US012703410B2

(12) United States Patent
Fernandes et al.

(10) Patent No.: US 12,703,410 B2
(45) Date of Patent: Aug. 11, 2026

(54) SYSTEMS AND METHODS FOR PROVIDING AUTONOMOUS TRAIN DRIVING STRATEGY

(71) Applicant: Progress Rail Locomotive Inc., LaGrange, IL (US)

(72) Inventors: Marcos Blanco Fernandes, Trophy Club, TX (US); Sammy Akif, Northlake, TX (US); Robert T. Wright, Carrollton, TX (US); Evan Whinery, Flower Mound, TX (US); Suhani Chacha, Irving, TX (US)

(73) Assignee: Progress Rail Locomotive Inc., LaGrange, IL (US)

( * ) Notice: Subject to any disclaimer, the term of this patent is extended or adjusted under 35 U.S.C. 154(b) by 26 days.

(21) Appl. No.: 18/784,649

(22) Filed: Jul. 25, 2024

(65) Prior Publication Data

US 2025/0381994 A1 Dec. 18, 2025

Related U.S. Application Data

(60) Provisional application No. 63/660,331, filed on Jun. 14, 2024.

(51) Int. Cl.
*B61L 27/04* (2006.01)
*G06N 20/00* (2019.01)

(52) U.S. Cl.
CPC .............. *B61L 27/04* (2013.01); *G06N 20/00* (2019.01)

(58) Field of Classification Search
CPC ................................ B61L 27/04; G06N 20/00
See application file for complete search history.

(56) References Cited

U.S. PATENT DOCUMENTS

2016/0176425 A1* 6/2016 Traylor ............... B61L 15/0063 701/19
2023/0017550 A1 1/2023 Ilmo et al.
2023/0141077 A1 5/2023 Nix et al.
2023/0174100 A1 6/2023 Jae et al.

FOREIGN PATENT DOCUMENTS

CN 115257809 A 11/2022
CN 117719535 A 3/2024
WO WO2022197252 A1 9/2022
WO WO-2023214970 A1 * 11/2023 ......... F02D 41/1459
WO WO-2024169313 A1 * 8/2024 ............ H04W 72/12

* cited by examiner

*Primary Examiner* — Joseph J Dallo

(57) ABSTRACT

Systems and method for operating a train are described herein. The train may include a plurality of nodes configured to detect a plurality of train variables and a train controller. The train controller including a memory storing computer-executable instructions; and a processor. The processor may be configured to receive a train model which may be configured to be used by a computation engine of the train controller to generate an output. The output may be displayed on an output device on the train controller. A human-user may input an indication into the train controller indicating that the generated output may be insufficient. The node data may be collected at a result of the input and transmitted to a train model generator.

20 Claims, 5 Drawing Sheets

SYSTEMS AND METHODS FOR PROVIDING AUTONOMOUS TRAIN DRIVING STRATEGY

CROSS-REFERENCE TO RELATED APPLICATIONS

This application claims priority to U.S. provisional patent application No. 63/660,331, filed Jun. 14, 2024, which is incorporated herein by reference for all purposes.

TECHNICAL FIELD

The present disclosure relates generally to operating a train, and more particularly, to method for developing and deploying an autonomous model for train operation and control.

BACKGROUND

The use of artificial intelligence or machine learning processes may be used to autonomously control and operate a number of vehicles. For example, an intelligent algorithm, such as a model or an agent, may be configured to control the functions of a train based both on the surrounding environment to be navigated as well as the traits of the train itself. Such a model may be trained using a variety of different training methods, however, due to the large number and dynamic nature of potential variables that vary from environment to environment, the model must be capable of navigating a significant amount of variation. Furthermore, the objectives of such a task may be in conflict, for example, there is an interest in a train arriving at a destination as quick as possible, however, this should not come at the cost of fuel-efficiency or safety. Therefore, to train a robust model, a significant amount of data, time, and expense must be incurred to provide the model with enough information to address each of the potential situations. Therefore, there is an interest in both training the model as efficiently as possible while collecting relevant, high-quality training information, in a more efficient and cost-effective way.

Some efforts have been made to use models for controlling train operations. For example, Chinese Patent No. 117719535A to Yanjun ("the '535 patent") describes a human-feedback interactive self-adaptive decision control method for an autonomous vehicle. The '535 patent describes the use of "human-in-the-loop" interaction feedback during operation to gradually incorporate human-decision making in the model, with the goal of simplifying the number of human tasks. However, the system and method described in the '535 have some deficiencies. For example, the '535 patent is specifically directed towards autonomous cars and does not account for other major environmental factors, systems, or controls which may only be present within the railway space. Furthermore, the '535 is designed such that a human driver's intervention is expected as the vehicle learns and fails to address a completely autonomous system.

Examples of the present disclosure are directed to overcoming deficiency of such systems and methods.

SUMMARY

In one aspect of the present disclosure, a train, including a plurality of nodes configured to detect a plurality of train variables using at least one sensor, wherein the plurality of nodes generates node data; and a train controller, the train controller including: a memory storing computer-executable instructions; and a processor in communication with the memory, the computer-executable instructions causing the processor to perform acts including: receiving a train model from a train model generator, wherein the train model is used by a computation engine of the train controller to generate at least one output using node data of a plurality of nodes; receiving node data from the plurality of nodes, wherein the node data includes information related to one or more of a speed of the train, a position of the train, or an acceleration of the train; generating at least one output by inputting the node data into the train model; displaying the generated output on an output device of the train controller; receiving an indication inputted into an input device of the train controller by a human-user, wherein the indication indicates that the generated output of the train model is insufficient; collecting the node data in response to receiving the indication; and transmitting the collected node data to the train model generator.

In another aspect of the present disclosure, a computer-implemented method of operating a train, the method including: obtaining run data associated with at least one prior operation of a second train; inputting the run data into a train model; generating, by the train model, an output based on run data; determining if the generated output of the train model is within a tolerance of the run data; if the generated output of the train model is not within a tolerance of the run data, adjusting the train model and determine if the generated output of the adjusted train model is within the tolerance of the run data; and if the generated output of the train model is within a tolerance of the run data, generating an updated version of the train model based on a reward structure, wherein: the reward structure is configured based on a received human input, anooga d the received human input indicates a difference between the generated output of the train model and an expected output.

In still another aspect of the present disclosure, a method of operating a train, the method including: receiving, by a train controller on-board the train, a train model from a train model generator, wherein the train model is used by the train controller to generate at least one output using node data of a plurality of nodes; receiving node data from the plurality of nodes, wherein the node data includes information related to one or more of a speed of the train, a position of the train, or an acceleration of the train; generating at least one output by inputting the node data into the train model; causing, by the train controller, the generated output to be provided via an operator interface operably connected to the train controller; receiving, an indication inputted into an input device of the train controller by a human-user, wherein the indication is configured to indicate that the generated output of the train model is insufficient; collecting the node data in response to receiving the indication; and transmitting the collected node data to the train model generator.

BRIEF DESCRIPTION OF THE DRAWINGS

The accompanying drawings, which are incorporated in and constitute part of this specification, illustrate various exemplary embodiments and, together with the detailed description, serve to explain the principles of the disclosed embodiments.

DETAILED DESCRIPTION

Wherever possible, the same reference numbers will be used throughout the drawings to refer to same or like parts.

Figure 1:
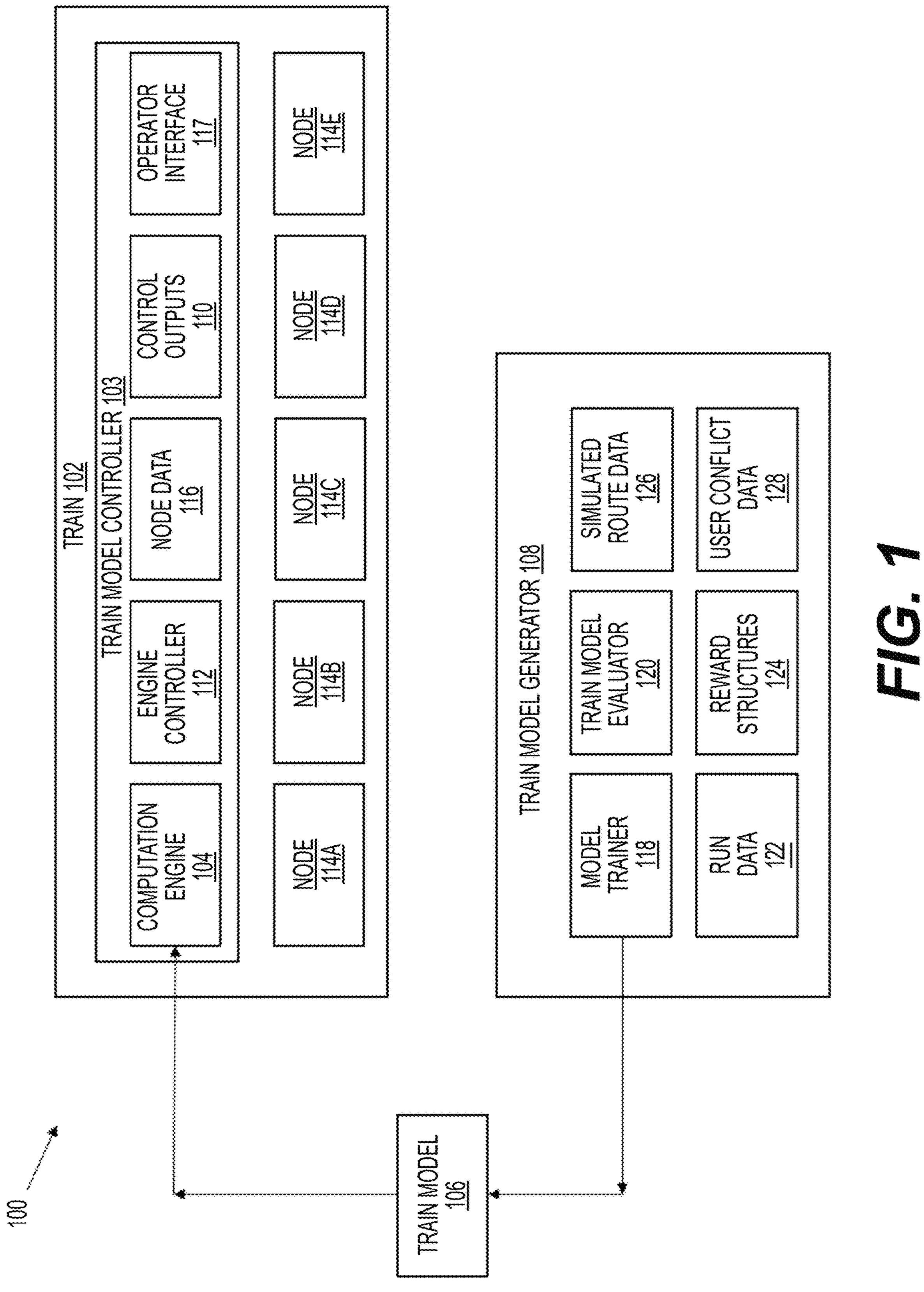
FIG. 1 is a schematic diagram of an exemplary system for generating, training, and operating a train using a train model, in accordance with one or more examples of the present disclosure.

Referring to the figures, FIG. 1 is a schematic illustration of a system 100 for operating a train 102 using a train controller 103, in accordance with one or more examples of the present disclosure. The train controller 103 includes a computation engine 104 that uses a train model 106 received from a train model generator 108 to calculate one or more control outputs 110 to control the train 102. The control outputs 110 are received by an engine controller 112 of the train controller 103 to control one or more aspects of the trains 102 such a, but not limited to, braking, acceleration, warning signals, sounds, indicator lights, headlights, and the like. The presently disclosed subject matter is not limited to the type or number of the control outputs 110 that may be generated by the computation engine 104 using the train model. The components mentioned above will be described in greater detail below in reference to FIG. 5.

In some examples, the train model 106 may be an algorithm used by the computation engine 104 to control train operations based on one or more inputs. In examples of the presently disclosed subject matter, the one or more inputs used by the train model 106 and the computation engine 104 are nodes 114A-114N (hereinafter individually referred to as "the node 114A," "the node 114B," and the like, and collectively as "the nodes 114") of the train 102. For example, the nodes 114 may comprise or otherwise include one or more sensors that may detect, sense, calculate, or otherwise determine a plurality of variables including, but not limited to, speed, acceleration, forces applied, throttle position, brake position, heading, environmental information, track information, etc. A variety of sensors may be used included, but not limited to, temperature sensors, pressure sensors, accelerometers, force sensors, image sensors, vibration sensors, etc.

Furthermore, the nodes 114 may incorporate data in relation to the environment surrounding the train 102 but is not directly collected using sensors positioned on the train itself. For example, the nodes 114 may include information related to the weather (temperature, wind, precipitation, etc.), specifics of the details of the track (i.e., speed limit, topography, potential damaged areas), details related to the cars being hauled, positions of other trains and the like. Additionally, information related to the cargo of the train may be collected, for example, the type of load, the length of the load, the weight of the load, vehicle properties like frontal area, length, draft gear types, number of axles, total weight loaded, tare weight, brake system type and valves, brake shoe types. Locomotive type and model and its traits like powertrain type, energy source and engine types, brake, energy recovery and auxiliary systems.

The presently disclosed subject matter is not limited to any particular type of node 114. The nodes 114 generate node data 116 that may be received by the computation engine 104 and inputted into the train model 106. The train model 106 may then generate a next operating step for the train 102 and computation engine 104 may then generate a control output 110 based on the calculations of the train model 106. In other words, the computation engine 104 uses the node data 116 and the train model 106 in tandem to generate one or more control outputs 110. As noted above, the one or more control outputs 110 are generated by the computation engine 104 and may be received by the engine controller 112 to perform actions such as, but not limited to, increasing or decreasing throttle, applying or releasing brakes, issues warning sounds, engage or disengage headlights, and the like.

Furthermore, the train controller 103 may incorporate an operator interface 117 which may be configured to display both the node data 116 as well as the control outputs 110 that may be generated by the computation engine 104 using the train model. In some embodiments, the operator interface 117 may be further configured such that a user may input information as to edit, modify, comment, review, or otherwise interact with the node data 116 and the control outputs 110. The operator interface 117 may take the form of an input and/or output device known in the art such as a display (e.g., a liquid crystal or thin-film transistor (TFT) display), a touchscreen, speakers, a vibrating mechanism, or a tactile feedback mechanism. Thus, the output device(s) can include a screen or display. The interface 117 may also include speakers, or similar devices, to play sounds or ringtones when an audio call or video call is received. The interface 117 may also include ports for one or more peripheral devices, such as headphones, peripheral speakers, or a peripheral display. Further, the interface 117 may be configured to accept a user input. In various implementations, the interface 117 include any input devices known in the art. For example, the interface 117 may include a camera, a microphone, or a keyboard/keypad. The interface 117 can include a touch-sensitive display or a keyboard to enable users to enter data and make requests and receive responses via web applications (e.g., in a web browser). A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like.

In some examples, the train model 106 is an algorithm generated and refined using one or more techniques known in the art, such as, but not limited to, supervised learning, unsupervised learning, deep learning, reinforcement learning, or evolutionary algorithms. In some embodiments, the train model 106 algorithm itself may take the form of a neural network, table, linear model, non-linear model, deep neural networks, or other methods known in the art. As noted previously, the train model 106 may be configured to accept the node data 116 as an input and ultimately output a set of information pertaining to the next desirable step of the train 102. In some embodiments, the output may take the form of a desired or predicted next-state of the train 102 based on the train model's 106 understanding of the node data 116. The desired or predicted next-state output by the train model may then be converted by the computation engine 104 into a set of control outputs 110 that may then be used to operate the physical train 102. In other embodiments, the train model 106 may output a list of commands or desired positions for each of the systems of the train 102 (i.e., position of the throttle, position of the dynamic brake, position of the air brake, etc.) which, in turn, may be converted by the computation engine 104 into a set of control outputs.

As mentioned previously, the number of variables and dynamic nature of the operating a vehicle such as a train 102 may require a complex, robust, and efficient train model 106. Therefore, in some embodiments, it is envisioned that a plurality of training methods such as those described above may be used in combination to develop a train model 106 which is capable of adapting to the dynamic environments while also replicating the expected behavior of a human train operator.

In order to generate and optimize the train model 106, system 100 includes a train model generator 108. Exemplary methods for generating and refining the train model 106 are discussed in further detail below in reference to FIGS. 2-4 but, generally, the train model generator 108 may include a model trainer 118 which is configured to interact with the data stored or received by the train model generator 108 to either generate or adjust the train model 106. Some examples of data which may be used by the train model generator 108 includes run data 122, reward structures 124, simulated route data 126, and user conflict data 128. Furthermore, the train model generator 108 may be in communication with the train 102 and train controller 103 such that the train model 106 or other information collected or received by either the train 102, train controller 103, or the train model generator 108 may be transmitted between each component.

Figure 2:
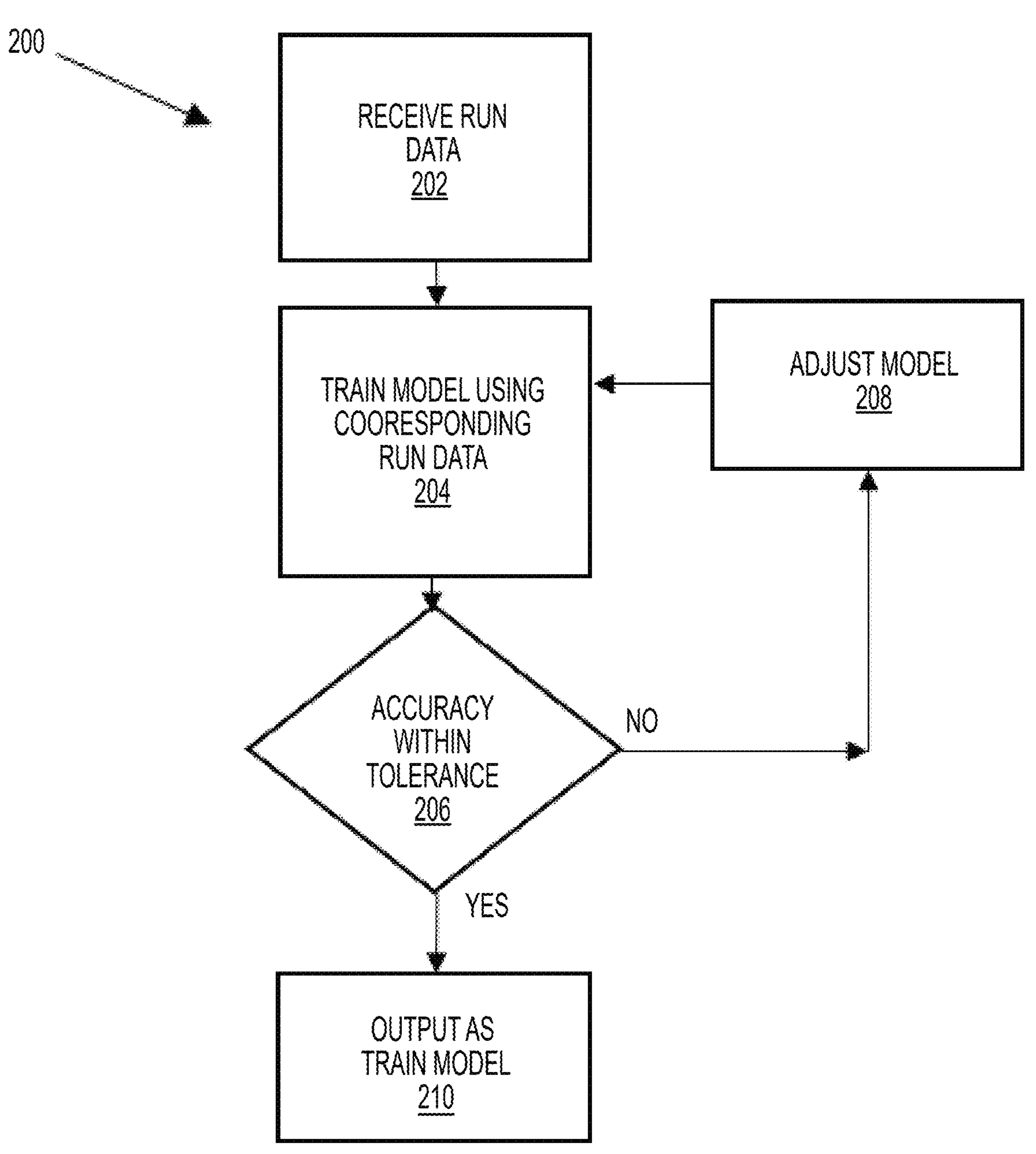
FIG. 2 illustrates a first method for operating a train, in accordance with various examples of the presently disclosed subject matter.

In reference to FIG. 2, which depicts a first method 200 for operating a train, in accordance with various examples of the presently disclosed subject matter. The method 200 and other processes described herein are illustrated as an example flow graph, each operation of which may represent a sequence of operation that can be implemented in hardware, software, or a combination thereof. In the context of software, the operations may represent computer-executable instructions including routines, programs, objects, components, data structure, and the like that perform particular functions or implement particular abstract data types. The order in which the operations are described may be combined or executed in any order and/or in parallel to implement the processes.

The method 200 commences at step 202, where data related to a real-life or simulated run is received. In examples of the presently disclosed subject matter, the run data 122 may contain data corresponding to an actual real-world run of a train on a track along a known route from an initial location to a destination or data related to a simulated runs conducted within a computer-based environment. In particular, the run data 122 may contain information corresponding with the node data 116 as discussed above. As discussed above, at least a portion of the node data 116 may be collected using sensors which detect a plurality of train parameters, including, but not limited to, speed of the train, temperature sensors, accelerometers, vibration sensors, and the like. Furthermore, the run data 122 may incorporate information relative to the environment during travel, for example, information related to the weather (temperature, wind, precipitation, etc.), position of nearby trains, etc. Information pertaining to the train itself may be incorporated into the run data 122 as well, for example, identification information of the train, the model of the train, age and condition of the train, the number of locomotives present, the number of remote units, the number of cars being hauled, the weight distribution of the cars, the cargo, or other pertinent information. The run data 122 may include track information in relation to the route the train traveled. The track information may identify a curvature of the track, the elevation of the track, the type of track, the position of signaling, etc. Furthermore, the run data 122 may include signaling information encountered during the run. For example, the signaling information may identify signals of the route, speed restrictions of the route, work zones along the route, or the like and the run data 122 may incorporate information related to the intended itinerary and any deviations which may have occurred.

Additionally, the run data 122 may include information in relation to control parameters. The control parameters may be indicative of operation commands which are issued to the train controller 103 by either a user or an existing train model 106. In other words, a control parameter may correspond to any component of the train and may be indicative of operation commands issued to the components of the train during the run. As an example, the control parameter information may be indicative of a throttle command to a throttle of the train (e.g., a throttle of a lead locomotive of the train, a throttle of a remote unit of the train, etc.), a dynamic brake command issued to a dynamic brake of the train, an air brake command issued to an air brake of the train, or the like. In some embodiments, instead of a command, the control parameters may include information related to the position of components of the train, for example, the position of the throttle, the position of the air brake, or the position of the dynamic brake. The control parameter information may be correlated with both a time and location information of the run such that each command may be both temporally and positionally mapped for the entire length of the run. For example, the location information may be a milepost, a duration of time, a geographic coordinate, a location identifier, or the like.

In other words, the run data 122 encapsulates each run such that the train model 106 may interact with and understand all the details that were collected. Furthermore, it is envisioned that the run data 122 may contain data related to a plurality of runs across a plurality of routes by a plurality of trains and the description herein is not intended to be limiting in anyway.

As noted above, the run data 122 may be simulated or contain information related to a real-life run, each will now be discussed respectively. To capture information regarding a real-life run, The train may incorporate a plurality of sensors to collect node data 116 associated with the train as well as the environment surrounding the train. The resulting collected run data 122 may, therefore, accurately reflect both the environment of the train as well as the operation technique of a user or a train model. Similarly, a simulated run may be completed or conducted in a simulation environment where the details of the route or the train itself are artificial, however, in such instances, a user, or existing train model 106, may provide inputs to the simulation to which the simulation may be updated. The resulting run data 122 will mirror the form of real-world run data 122, providing both node data 116 and control parameters which may be used in conjunction with method 200. Using simulated run data 122 provides for a wide variety of scenarios and situations to be explored and a significant amount of run data 122 to be collected without the cost of operating a real train and to explore potential situations which may be difficult to find or non-existent in the real-world.

At step 204, the train model 106 may be trained using the received corresponding run data 122. As noted previously, the train model 106 may be an artificial intelligence agent which may be trained using methods known in the art such as machine learning, reinforcement learning, etc. In some embodiments, the train model 106 may incorporate a neural network, a linear regression model, a logistic regression model, a decision tree, a support vector machine, or the like.

In such an instance, the train model 106 may be train by observing the run data 122. The train model 106 may accept the node data 116 and attempt to recreate and output information that is consistent with the control parameters associated with the run data 122. In some embodiments, methods such as, but not limited to, imitation learning, behavioral cloning, mimic learning, supervised learning, semi-supervised learning or learning from demonstration may be used to efficiently generate or create a train model 106 which attempts to mirror the actions of the user which created each run. In other words, the resulting train model 106 may use a policy which inputs the node data 116 and subsequently outputs information which may be in accordance with what was reflected within the run data 122. This method is efficient for developing a preliminary or advance model during an exploration phase of an environment. In some embodiments, the model trainer 118 of the train model generator 108 may be used to complete step 204, however, this is not necessary.

At step 206, the train model 106 may be reviewed to ensure the train model 106 is within a specific tolerance or predetermined value or range. In other words, the train model 106 may be reviewed to ensure that the outputs of the train model 106 are in accordance with the run data 122. For example, if the run data 122 indicates that a stop signal was received, the train model 106 should likely react by outputting information which results in throttling down and applying the brakes. Furthermore, it may be appreciated that the run data 122 may indicate that a specific magnitude of throttling down or the application of a certain amount of brakes was applied. The specific threshold or predetermined ranges may be generated using the norm expected by a train operator, or regulations associated with controlling a train or may be drawn from the run data 122 itself. In such instances, the outputs of the train model 106 may be compared against the expected or appreciated control parameters of the run data 122 to ensure that the outputs of the train model 106 are within a tolerance. In some embodiments, step 206 may be accomplished using a train model evaluator 120 of the train model generator 108, though this is not necessary.

If at step 206 it is determined that the train model 106 is not within an expected tolerance, the method 200 continues to step 208 where the policy of the train model 106 may be adjusted resulting in an iteration of the train model 106. In other words, a machine learning process may be used to adjust the policy of the train model 106 by altering elements of the train model 106 and then returning the adjusted train model 106 to step 204 to rerun the training process and to, ultimately, reevaluate the accuracy of the train model 106 via step 206.

If at step 206 it is determined that the train model 106 is within an expected tolerance, the train model generator 108 may deploy or indicate that the train model 106 is completed training on the indicated run data 122. In some embodiments, the train model generator 108 may proceed to step 210 where the train model 106 is output and may be deployed to the train 102 itself or merely update the previous train model 106 to the current train model 106.

Figure 3:
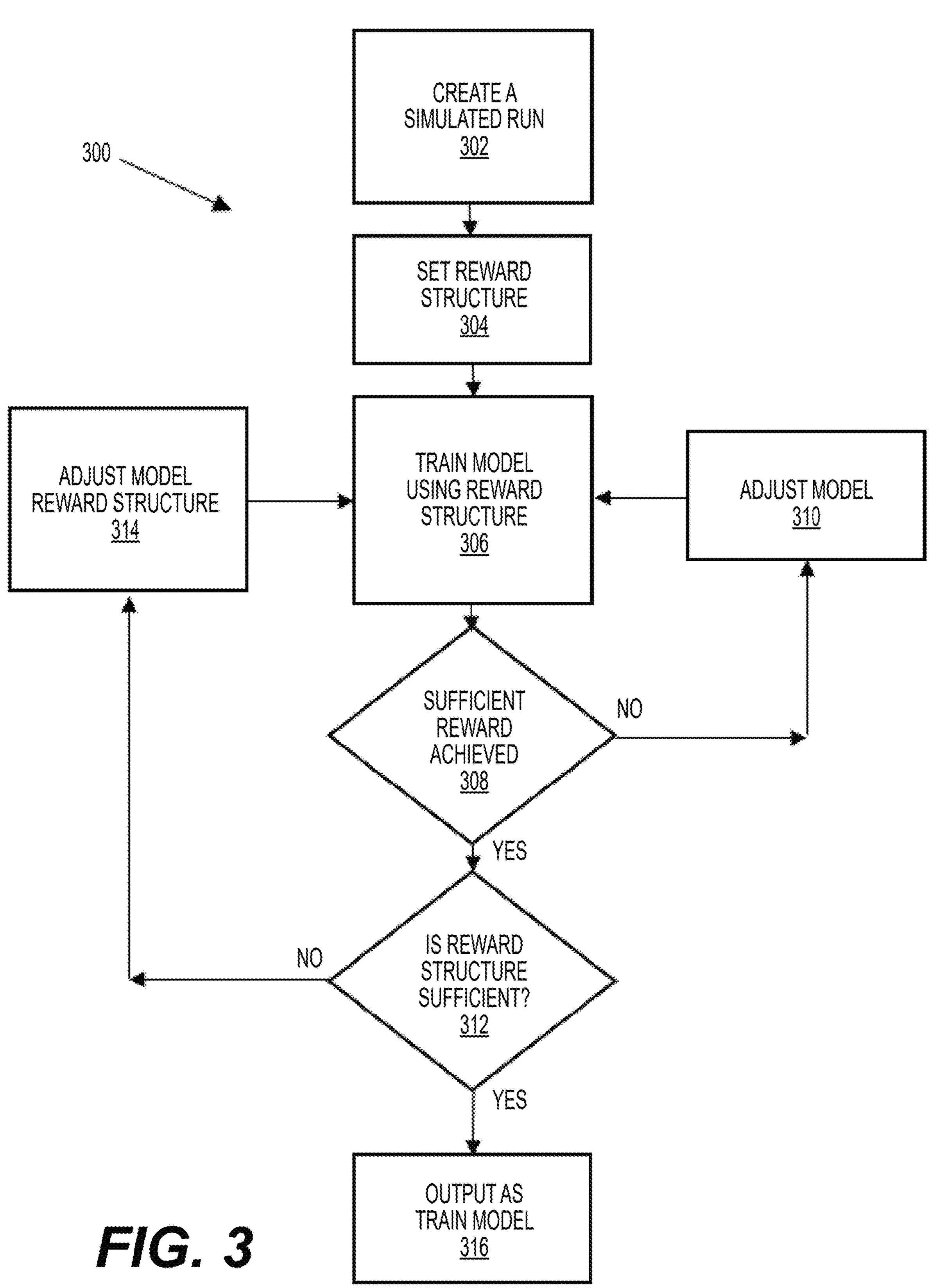
FIG. 3 illustrates a second method for operating a train, in accordance with various examples of the presently disclosed subject matter.

In reference to FIG. 3, which depicts a second method 300 for operating a train, in accordance with various examples of the presently disclosed subject matter. The method 300 and other processes described herein are illustrated as example flow graph, each operation of which may represent a sequence of operation that can be implemented in hardware, software, or a combination thereof. In the context of software, the operations represent computer-executable instructions including routines, programs, objects, components, data structure, and the like that perform particular functions or implement particular abstract data types. The order in which the operations are described can be combined or executed in any order and/or in parallel to implement the processes.

The method 300 commences at step 302, where simulated route data 126 is received. In examples of the presently disclosed subject matter, the simulated route data 126 may contain data corresponding to an actual real-life route or an artificial non-existent route. For example, the simulated route data 126 may contain real-world node data 116 or artificially created node data 116 which may be associated with an environment or scenario. Similar to the run data 122 described above, the simulated route data 126 may incorporate information relative to the environment during travel, for example, data related to the weather (temperature, wind, precipitation, etc.), climate, or other factors. Information pertaining to the train itself may be incorporated into the run data 122 as well, for example, identification information of the train, the model of the rain, age and condition of the train, the number of locomotives present, the number of remote units, the number of cars being hauled, the weight distribution of the cars, the cargo, or other pertinent information to the train dynamics and its movement. Furthermore, the simulated route data 126 may include track information in relation to the route itself. The track information may identify a curvature of the track, the elevation of the track, the type of track, the position of signaling, etc. Furthermore, the run data 122 may include signaling information encountered during the run. For example, the signaling information may identify signal positions of the route, speed restrictions of the route, work zones along the route, or the like. However, unlike the run data 122, the simulated route may include incomplete or nonexistent control parameter information and instead merely sets a scenario or environment for the train model 106 to explore via a computer-based simulation.

At step 304, an initial reward structure 124 may be set for use with training the train model 106. In some instances, a reward structure may be used during machine learning processes to assist in defining an objective for the train model 106 to iteratively move towards. Reward structures may be statically defined at the beginning and stay consistent throughout the training process or may be dynamic and change iteratively alongside the train model 106. As mentioned previously, operating a train incorporates a variety of objectives including, but not limited to, speed, fuel efficiency, and safety. Therefore, in order to create an efficient and accurate train model 106, a reward structure which encourages speed but maximizes both fuel efficiency and safety may be desired. As can be appreciated, these are competing objectives which can make defining a robust and efficient reward structure a difficult proposition. In some embodiments, methods known in the art may be used to set the initial reward structure such as handcrafted rewards, sparse rewards, dense rewards, reward shaping, etc.

At step 306, the train model 106 may be trained using the set reward structure. As noted previously, the train model 106 may be an artificial intelligence agent which may be trained using methods known in the art such machine learning process, reinforcement learning, or the like. In some embodiments, it is envisioned that the training of the train model 106 through the use of a reward structure may be conducted using any method known in the art such as, but not limited to, machine learning process and reinforcement learning methods.

In further detail, the train model 106 may input the simulated route data 126 and generate a series of outputs based on the train model's 106 understanding of the environment. During the training, the reward structure 124 may be used to grade the quality of the train model 106 and may associate positive rewards with desired actions and negative rewards with undesirable actions to encourage the train model 106 to move towards the rewarded actions. In other words, the train model 106 is being iteratively adjusted and changed in an attempt to find an understanding of the route data 126 which results in the most effective method for completing the desired task. The reward structure 124 may consider a variety of factors including, but is not limited to, an estimated time to traverse the route, fuel consumption, and acceptable in-train forces. Once the reward structure 124 has either been locally or absolutely maximized, a period of time has elapsed, or a number of cycles has elapsed the method may progress to step 308.

At step 308, the train model 106 may be reviewed to determine if a specific reward threshold has been achieved. In other words, the outputs of the train model 106 may be reviewed to see if they meet the desired objective associated with the assigned reward structure 124 and to see if the train model 106 is sufficiently maximizing the parameters of the reward structure 124.

If at step 308 it is determined that the train model 106 does not achieve a specific threshold, the method 300 continues to step 310 where the policy of the train model 106 may be adjusted resulting in an iteration of the train model 106. In other words, a machine learning process may be used to adjust the policy of the train model 106 by altering the weighting or bias of the train model 106 and then returning the updated train model 106 to step 204 to rerun the training process.

If at step 308 it is determined that the train model 106 has achieved a specified reward threshold, the method 300 continues to step 312 where the train model 106 may be further reviewed by a user to ensure that the present reward structure is achieving a desired outcome. For example, a specific reward structure may result in a localized or inefficient solution and, to continue improving the efficiency and accuracy of the train model 106, the reward structure 124 may need to be adjusted to provide for further training of the train model 106.

If at step 312, a user determines that the train model 106 needs further training, refining, or optimizing, the method 300 continues to step 314. At step 314, the reward structure 124 may be dynamically altered as to further train the train model 106. In some embodiments, a reinforced learning process may become stuck at an inefficient solution or be unable to achieve the desired objecting. This is particularly common while training a model on a complex task. Therefore, in such instances, it may be beneficial to iteratively alter the reward structure 124 alongside the train model 106 as to provide guidance to the train model 106 to encourage desired behaviors or intermediate goals throughout the training process. It is envisioned that methods known in the art for dynamically altering the reward structure 124 such as, but not limited to, reward shaping, temporal difference learning, adaptive reward scaling, multi-objective reinforcement learning, environment monitoring and adaptation, etc.

In some embodiments, it is envisioned that a user may review the train model 106 and provide feedback as to the quality of the train model's outputs. Based on this provided feedback, the reward structure 124 may be altered to better accommodate or emphasize the particular feedback. For example, a user may identify a particular action that a typical user may take due to norms, particular training, habits, experience, or other unquantifiable reason to which the train model 106 may not duplicate. For example, a train operator may be accustomed to applying train brakes while providing traction power with remote locomotives to avoid excessive stretching of train couplers in a specific region of the track route, however, the train model 106 may determine that the application of train brakes while powering is fuel inefficient and should choose to not do so while still maintain acceptable force levels. In such an instance, the human feedback may be used to adjust or alter directly or indirectly the reward structure in order to encourage the train model 106 to conform with the local norms, customs, or training of the human. By iteratively refining the reward structure based on real-time human feedback or comparing, qualifying, and classifying different models 106 produced, the train model 106 may be better aligned with real-world rail conditions and regulations and may better enable the train model 106 to better respond to unfamiliar environments.

In some embodiments, the reward structure 124 may be manually altered using methods discussed above or may be inferred and adapted based on the run data 122 as discussed in conjunction with method 200 above. In other words, in traditional reinforcement learning, the reward structure 124 may be set based on a known objective or intended action, wherein, in some embodiments, the reward structure may be inferred by observing run data 122 of a skilled user. In some instances, particularly complex tasks with many competing objectives, such as speed and safety, it may be difficult to efficiently assign importance to each objective. Therefore, in some embodiments, it is envisioned that methods known in the art such as, but not limited to, inverse reinforcement learning may be used to observe the behavior of a user to deduce or infer the reward structure 124 of a user. In some examples, a user or method may be used to compare, qualify, or classify different methods and models to determine a reward function which may better fit a chosen outcome. For example, a user may be provided with a plurality of potential outputs and asked to choose the most accurate one and, based on the user's feedback, a reward function may be deduced which reflects the user's choice of one output over another. Such a method may provide the train model 106 with a better understanding real-world behavior by implicitly modeling the reward structure 124 desired by human actors, and, in some embodiments, leading to a more robust and identifiable model to be created.

The introduction of human feedback or human observance in order to define the reward structures increases the efficiency and accuracy at which the train model 106 may be generated compared to other methods. Furthermore, by leveraging the innate understanding of a human operator, the train model 106 may be trained to better understand and interact with an environment in a way that may be better understood by said human operators.

Furthermore, it is envisioned that method 300 may be used in conjunction with method 200 to create and train a train model 106 using a variety of techniques. In some embodiments, the resulting train model 106 may be more robust, efficient, and adaptable in comparison to a model generated and trained only using a singular method. For example, merely training the train model 106 using the run data 122 may results in a train model 106 that is adapted to known routes and situations, however, may be poorly equipped to handle novel environments. Additionally, only training the train model 106 using reward structures may result in a cost-efficient and time-consuming process of developing a functioning initial model wherein using the run data 122 allows for the train model 106 to efficiently explore a space in comparison.

If at step 312 it is determined that the reward structure used to train the current version of the train model 106 is sufficient, the train model generator 108 may deploy or indicate that the train model 106 is completed training based on the applied reward structure. In some embodiments, the train model generator 108 may deploy the train model 106 to the train itself 102.

Figure 4:
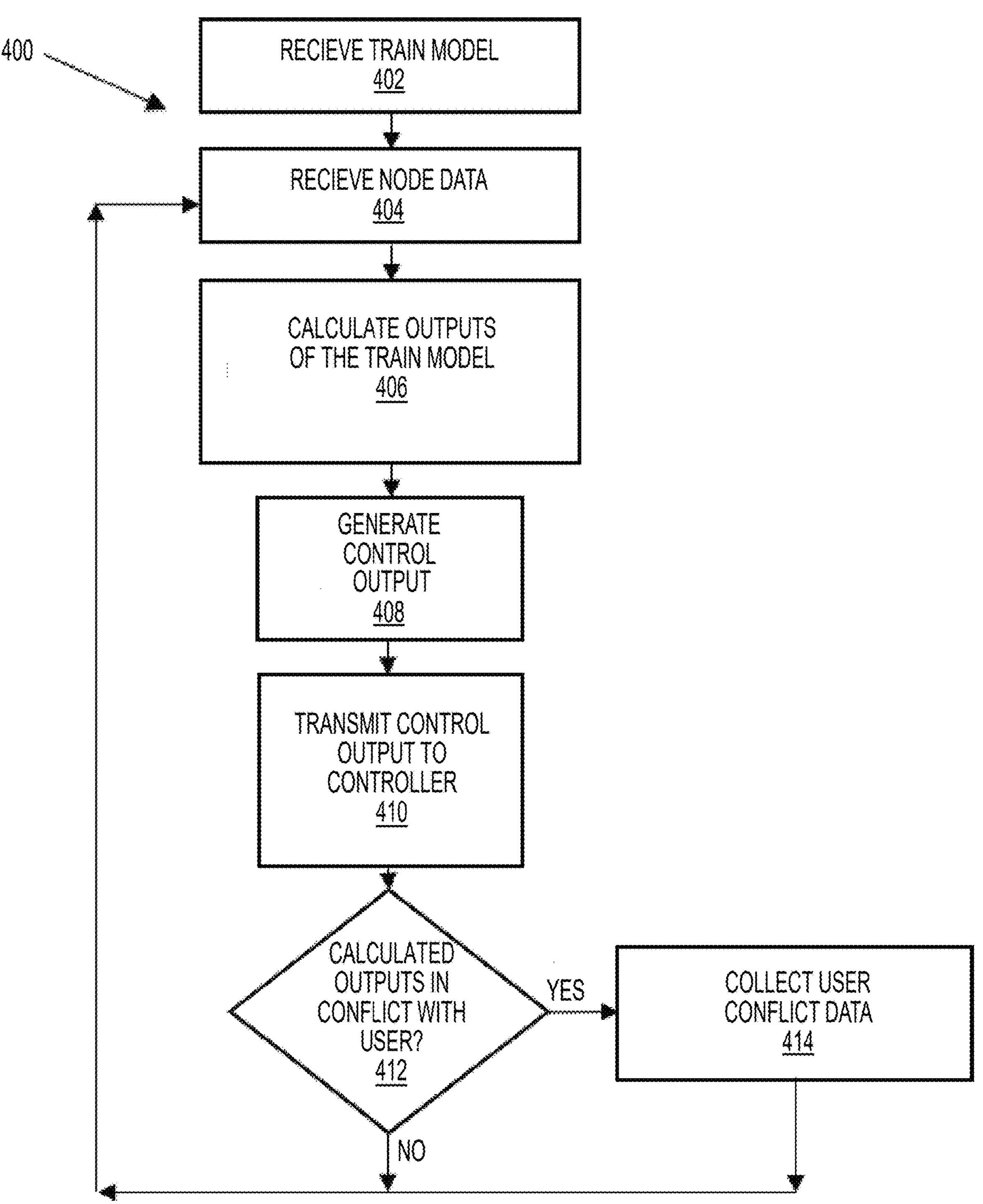
FIG. 4 illustrates a third method for operating a train in accordance with various examples of the presently disclosed subject matter.

FIG. 4 is a method 400 for operating a train 102 using the train controller 103, in accordance with various examples of the presently disclosed subject matter The method 400 commences at step 402, where the computation engine 104 receives the train model 106 from the train model generator 108. An example process for generating the train model is discussed in detail above with reference to method 200 and method 300. As noted, the train model 106 may be one or more algorithms that are used to calculate one or more outputs based on the collected node data 116.

At step 404, the computation engine 104 may receive the node data 116 provided by the plurality of nodes 114. As noted above, the node data 116 may include information related to the train itself such as, but not limited to, speed, acceleration, pressure levels, brake application, etc. Additionally, the node data 116 may incorporate environmental information related to the topography of the ground, the weather, track data, car data, etc. In some embodiments, the node data 116 may be either collected using sensors on the train or may be communicated to the computation engine remotely from other systems.

At step 406, the train model 106 may calculate or generate at least one output related to the control of the train. To explain further, the node data 116 may be inputted into the train model 106 and, based on the training conducted within method 200 and/or method 300, the train model 106 may be configured to output a set of information pertaining to the next desirable step of the train or may output a list of commands or desired positions for each of the systems of the train. As noted above, the train model 106 may take the form of an algorithm which is generated or refined using one or more techniques known in the art, such as, but not limited to, supervised learning, unsupervised learning, deep learning, reinforcement learning, or evolutionary algorithms. In some embodiments, the train model 106 algorithm itself may take the form of a neural network, table, linear model, non-linear model, deep neural networks, or other methods known in the art.

At step 408, the computation engine 104 may generate at least one control output 110 based on the one or more outputs of the train model 106 calculated in step 406. For example, if the computation engine 104 identifies that a throttle down is necessary based on the output of the train model 106, the computation engine 104 may generate a control output 110 for such an action. Furthermore, it is envisioned that the computation engine 104 may determine that the one or more outputs of the train model 106 result in a control output 110 which indicates to not take any action as well.

At step 410, the computation engine 104 may transmit the at least one control output 110 determined in step 408 to the engine controller 112. Once receiving the at least one control output, the engine controller 112 may provide instructions to one or more systems of the train 102 based on the control output 110. For example, if the control output 110 is to engage the brakes of the train 102, the engine controller 112 may engage the brakes. The train controller 103 is described in greater detail below in reference to FIG. 5.

At step 412, a user may be monitoring the outputs of the train model 106 or the control outputs 110 of the computation engine 104 by way of a user interface 117 positioned on the train controller 103. The user may monitor the outputs of the train model 106 or control outputs 110 generated by the computation engine 112 throughout the length of the run of the train 102 to provide feedback if the user disagrees with any of the outputs of the train model 106 or the control outputs 110 of the computation engine. For example, the train model 106 may be traveling through a yard and may set the speed of the train to a specific threshold, however, the user may be aware that in this instance it may be more beneficial to reduce the speed further in response to an increased traffic within the yard. In such an instance, the user may interact with the train controller 103 to indicate their disagreement with the train model 106. The user may input a general disagreement with the set speed or may, more particularly, input a specific desired speed. Furthermore, the user may provide written or general feedback to the nature of the disagreement. The situation described above is merely exemplary and is not intended to be limiting; it is envisioned that a user may provide feedback at any step of the navigation of the train.

If at step 412 a user conflict is indicated, the method 400 continues to step 414 whereby the train controller 103 will record user conflict data 128. In particular, the user conflict data 128 may include information related to the time of the conflict as well as the node information 116 in relation to the train and environment of the conflict. As noted above, any information which the user provided such as the desired outputs of the train model 106 or control outputs 110 of the computation engine 112 or other additional written feedback may also be collected. The train controller 103 may then store the user conflict data 128 and/or transmit the user conflict data 128 to the train model generator 108.

In some embodiments, the user conflict data 128 may be incorporated in further training of the train model 106 in accordance with the method discussed in methods 200 and 300. For example, the user conflict data 128 may be used to create simulated run data 122 which may be used in step 202 of method 200 to generate or train an updated version of the train model 106. Similarly, the user conflict data 128 may be used within step 304 or step 314 of method 300 to assist in determining an updated reward structure 124 which may be used to further refine the train model 106.

Figure 5:
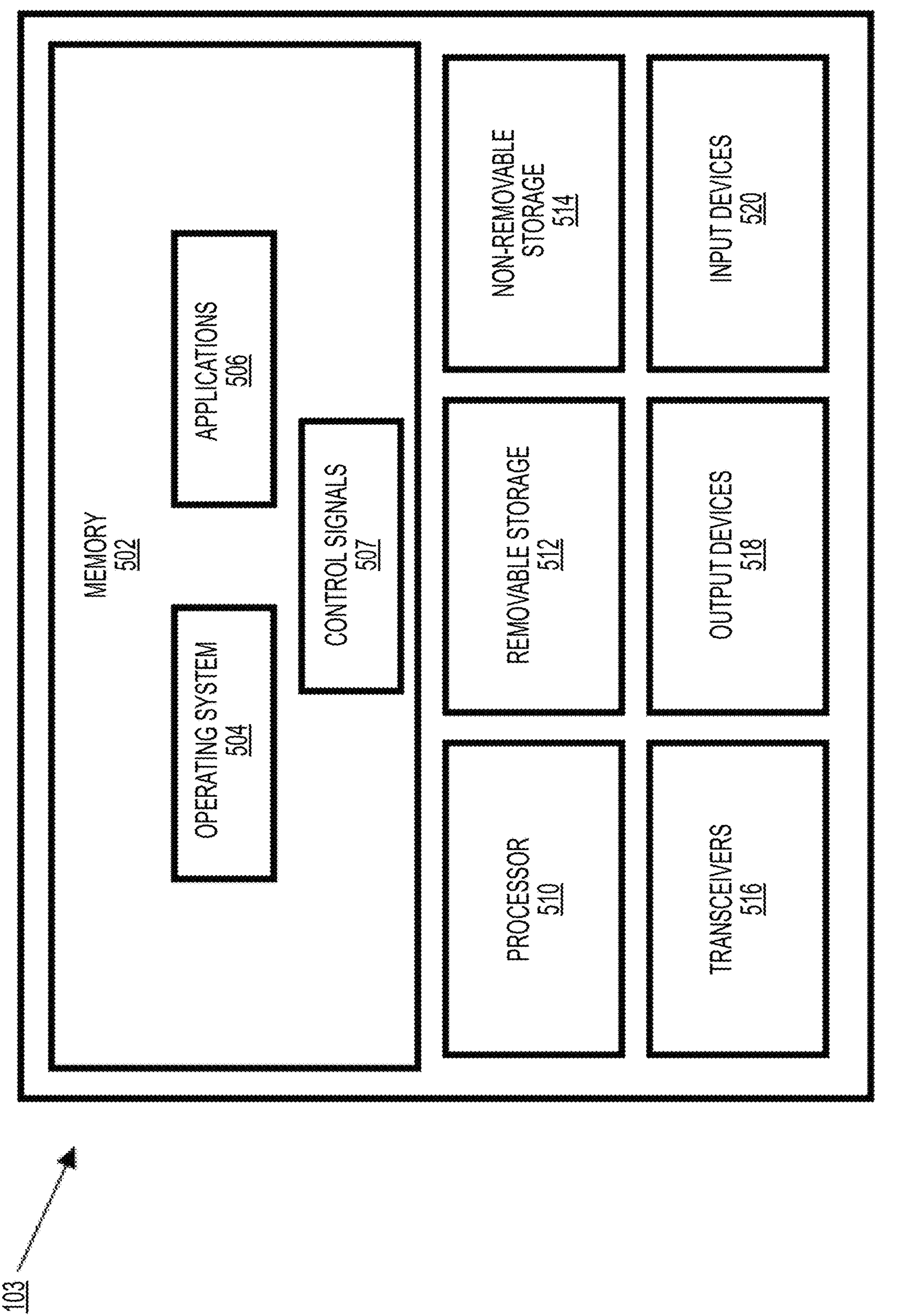
FIG. 5 depicts a component level view of an engine controller for use with the systems and methods described herein, in accordance with various examples of the presently disclosed subject matter.

FIG. 5 depicts a component level view of the train controller 103 for use with the systems and methods described herein, in accordance with various examples of the presently disclosed subject matter. The train controller 103 could be any device capable of providing the functionality associated with the systems and methods described herein. The train controller 103 can include several components to execute the above-mentioned functions. The train controller 103 may be comprised of hardware, software, or various combinations thereof. As discussed below, the train controller 103 can comprise memory 502 including an operating system (OS) 504 and one or more standard applications 506. The standard applications 506 may include applications that generate control signals 507 to operate the train 102 based on the control outputs 110 received from the computation engine 104.

The train controller 103 can also include one or more processors 510 and one or more of removable storage 512, non-removable storage 514, transceiver(s) 516, output device(s) 518, and input device(s) 520. In various implementations, the memory 502 can be volatile (such as random-access memory (RAM)), non-volatile (such as read only memory (ROM), flash memory, etc.), or some combination of the two. The memory 502 can include data pertaining to the control signals 507 associated with the control outputs 110 received from the computation engine 104.

The memory 502 can also include the OS 504. The OS 504 varies depending on the manufacturer of the train controller 103. The OS 504 contains the modules and software that support basic functions of the train controller 103, such as scheduling tasks, executing applications, and controlling peripherals. The OS 504 can also enable the train controller 103 to send and retrieve other data and perform other functions, such as issue the control signals 507 to one or more systems of the train 102.

The train controller 103 can also comprise one or more processors 510. In some implementations, the processor(s) 510 can be one or more central processing units (CPUs), graphics processing units (GPUs), both CPU and GPU, or any other combinations and numbers of processing units. The train controller 103 may also include additional data storage devices (removable and/or non-removable) such as, for example, magnetic disks, optical disks, or tape. Such additional storage is illustrated in FIG. 5 by removable storage 512 and non-removable storage 514.

Non-transitory computer-readable media may include volatile and nonvolatile, removable and non-removable tangible, physical media implemented in technology for storage of information, such as computer readable instructions, data structures, program modules, or other data. The memory 502, removable storage 512, and non-removable storage 514 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the train controller 103. Any such non-transitory computer-readable media may be part of the train controller 103 or may be a separate database, databank, remote server, or cloud-based server.

In some implementations, the transceiver(s) 516 include any transceivers known in the art. In some examples, the transceiver(s) 516 can include wireless modem(s) to facilitate wireless connectivity with other components (e.g., between the train controller 103 and one or more systems of the train 102), the Internet, and/or an intranet. Specifically, the transceiver(s) 516 can include one or more transceivers that can enable the train controller 103 to send the control signals 507, receive the control outputs 110, and/or receive the train model 106. Thus, the transceiver(s) 516 can include multiple single-channel transceivers or a multi-frequency, multi-channel transceiver to enable the train controller 103 to send and receive video calls, audio calls, messaging, etc. The transceiver(s) 416 can enable the train controller 103 to connect to multiple networks including, but not limited to 2G, 3G, 4G, 5G, and Wi-Fi networks. The transceiver(s) 516 can also include one or more transceivers to enable the train controller 103 to connect to future (e.g., 6G) networks, Internet-of-Things (IoT), machine-to machine (M2M), and other current and future networks.

The transceiver(s) 516 may also include one or more radio transceivers that perform the function of transmitting and receiving radio frequency communications via an antenna (e.g., Wi-Fi or Bluetooth®). In other examples, the transceiver(s) 516 may include wired communication components, such as a wired modem or Ethernet port, for communicating via one or more wired networks. The transceiver (s) 516 can enable the train controller 103 to facilitate audio and video calls, download files, access web applications, and provide other communications associated with the systems and methods, described above.

In some implementations, the output device(s) 518 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 518 can also include speakers, or similar devices, to play sounds or ringtones when an audio call or video call is received. Output device(s) 418 can also include ports for one or more peripheral devices, such as headphones, peripheral speakers, or a peripheral display.

In various implementations, input device(s) 520 include any input devices known in the art. For example, the input device(s) 520 may include a camera, a microphone, or a keyboard/keypad. The input device(s) 520 can include a touch-sensitive display or a keyboard to enable users to enter data and make requests and receive responses via web applications (e.g., in a web browser), make audio and video calls, and use the standard applications 506, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 520 and an output device 518.

INDUSTRIAL APPLICABILITY

The present disclosure relates generally to the generations, use, and training of the train model 106 to control various aspects of the train 102. The train model 106 is an algorithm that is generated and trained using traditional machine learning processes as well as advanced processes such as reinforcement learning, learning from demonstration, reward shaping, inverse reinforcement learning, and reinforcement learning with human feedback. The train model 106 uses node data 116 which is related to the train itself and the environment surrounding the train to determine a set of control parameters which may be used to control the operation of the train 102.

Due to the complexity and dynamic environment of operating a train, a significant amount of resources are necessary to create a train model 106 which is capable of efficiently and accurately operating a train. Therefore, traditional methods may be insufficient to create the necessary level of complexity required. By integrating human feedback and demonstration into the training process, human expertise may be leveraged, enabling more efficient and effective learning despite the large number of diverse environments. For example, existing or simulated runs may be used to efficiently explore an environment, providing the train model 106 with a preliminary understanding while reducing the time and resources typically associated with initially generating a model. Furthermore, real-time human feedback may be integrated into the training process to adjust and refine a reward function as to better align the model with real-world scenarios and enabling the system to better respond to unpredictable scenarios. Finally, existing complex human behavior may be leveraged and observed to better understand adjust the reward structure by implicitly inferring what may be important to a human operator at specific scenarios, further increasing the robustness of the resulting train model 106.

Despite the benefits described above of incorporating human feedback into the training process, collecting the amount of data required may result in slow progress and high costs. Therefore, the system and methods described here are configured to collect human feedback during real-time operation of a train by the train model. By deploying the systems described herein to the large number of trains and crews in operation, a large amount of human feedback may be collected and then used to further train updated train models 106. The additional feedback collected may then be used in the processes described above to further refine the train models 106 and increase the overall robustness, accuracy, and efficiency of future train models 106 while reducing the costs and time consumption association with traditional methods of collecting human feedback.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A train system, comprising:
- a plurality of nodes configured to detect a plurality of train variables using at least one sensor, wherein the plurality of nodes generates node data associated with at least a dynamic environment around the train during movement of the train along tracks; and
- a train controller, the train controller comprising:
  - an input device;
  - an output device;
  - a memory storing computer-executable instructions; and
  - a processor in communication with the memory, the computer-executable instructions causing the processor to perform acts comprising:
    - receiving a train model from a train model generator;
    - executing, by a computation engine of the train controller, the train model to control the train;
    - receiving the node data from the plurality of nodes during the movement of the train along the tracks;
    - displaying an output of the train model on the output device;
    - receiving user-conflict data inputted into the input device by a human-user during the movement of the train along the tracks, the user-conflict data indicating a disagreement by the human-user with the output of the train model relating to driving the train; and
    - transmitting the user-conflict data collected node data to the train model generator.

2. The train system of claim 1, wherein the user-conflict data includes feedback from the human-user on the nature of the disagreement.

3. The train system of claim 1, further comprising the train model generator, the train model generator configured to perform acts comprising adjusting the train model based on the user-conflict data received from the processor.

4. The train system of claim 3, wherein adjusting the train model further comprises:
- setting a reward structure based on the node data associated with the received user-conflict data; and
- generating an updated version of the train model based on the reward structure.

5. The train system of claim 4, wherein generating an updated version of the train model further comprises:
- inputting the node data into the train model;
- generating a second output based on the node data using the train model;
- determining that the second output of the train model exceeds a reward threshold of the reward structure; and
- at least in part in response to the second output of the train model exceeding the reward threshold, outputting an updated train model.

6. The train system of claim 5, wherein generating an updated version of the train model further includes:
- receiving second user-conflict data, the second user-conflict data indicating a second disagreement by the human-user with the output of the updated train model;
- based at least in part on the second user-conflict data, adjusting the reward structure; and
- outputting a second updated train model.

7. The train system of claim 1, wherein the node data comprises information relating to the environment, the train, the track, signals, or positions of other trains.

8. A computer-implemented method of operating a train, the method comprising:
- executing a train model to obtain movement of the train along tracks;
- obtaining run data associated with at least a dynamic environment around the train during the movement of the train along the tracks;
- inputting the run data into the train model;
- generating, by the train model, an output based on the run data;
- displaying the output of the train model for review by a human-user during the movement of the train along the tracks;
- receiving user-conflict data from the human-user during the movement of the train along the tracks, the user-conflict data indicating a disagreement by the human-user with the output of the train model relating to driving the train;
- adjusting a reward structure into an updated reward structure for training the train model based, at least in part, on the user-conflict data; and
- generating an updated train model based on the updated reward structure.

9. The method of claim 8, wherein the run data includes:
- data related to one or more of a speed of the train, a position of the train, an acceleration of the train, or rail data; and control parameters related to one or more of a throttle of the train or a brake of the train.

10. The method of claim 9, wherein the user-conflict data includes feedback from the human-user on the nature of the disagreement.

11. The method of claim 8, wherein generating an updated train model based on the updated reward structure comprises:

receiving simulated route data;

inputting the simulated route data into the updated train model;

calculating a second output based on the simulated route data;

determining that the second output of the updated train model exceeds a reward threshold of the updated reward structure; and at least in part in response to the second output of the updated train model exceeding the reward threshold, outputting a second updated train model.

12. The method of claim 8, wherein displaying the output of the train model for review comprises providing a plurality of potential outputs of the train model for selection by the human-user during the movement of the train along the tracks.

13. The method of claim 11, wherein the simulated route data includes a type of track, a length of track, and a position of signaling.

14. A method of operating a train, the method comprising:

receiving, by a train controller on-board the train, a train model from a train model generator, wherein the train model is used by the train controller to generate an output using node data of a plurality of nodes;

executing the train model to obtain movement of the train along tracks;

receiving node data from the plurality of nodes during movement of the train along tracks, wherein the node data includes information related to at least a dynamic environment around the train;

causing, by the train controller, an output of the train model to be provided via an operator interface operably connected to the train controller;

receiving user-conflict data inputted into an input device of the train controller by a human-user during the movement of the train along the tracks, the user-conflict data indicating a disagreement by the human-user with the output of the train model relating to driving the train; and transmitting the user-conflict data to the train model generator.

15. The method of claim 14, wherein the user-conflict data includes feedback from the human-user on the nature of the disagreement.

16. The method of claim 14, further comprising adjusting, by the train model generator, the train model based on the user-conflict data.

17. The method of claim 16, wherein adjusting the train model further comprises:

setting a reward structure based on the node data associated with the received user-conflict data; and adjusting the train model using the reward structure.

18. The method of claim 17, wherein adjusting the model further comprises:

inputting the node data into the train model;

generating a second output based on the node data using the train model;

determining that the second output of the train model exceeds a reward threshold of the reward structure; and at least in part in response to the second output of the train model exceeding the reward threshold, outputting an updated train model.

19. The method of claim 18, wherein adjusting the train model further includes:

receiving second user-conflict data, the second user-conflict data indicating a second disagreement by the human-user with the output of the updated train model;

based at least in part on the second user-conflict data, adjusting the reward structure; and outputting a second updated train model.

20. The method of claim 14, wherein the node data comprises information relating to the environment, the train, the track, signals, or positions of other trains.

* * * * *